Jan. 13, 1948.  R. A. DEAN  2,434,311
DENTAL MIRROR
Filed July 15, 1944

INVENTOR
ROBERT A. DEAN
By Paul, Paul & Moore
ATTORNEYS

Patented Jan. 13, 1948

2,434,311

UNITED STATES PATENT OFFICE 2,434,311

DENTAL MIRROR

Robert A. Dean, Minneapolis, Minn.

Application July 15, 1944, Serial No. 545,075

1 Claim. (Cl. 32—69)

This invention relates to new and useful improvements in dental mirrors and more particularly to an attachment therefor to facilitate guiding a filling material into a tooth cavity.

In the operations of dental surgery it is necessary to make constant use of the dental or mouth mirror which takes up room in the mouth and some time interferes with the operation of inserting a filling material into a tooth cavity. This is more particularly true when operating upon teeth of the upper jaw. To facilitate the operation of inserting a filling into the cavity of an upper tooth, I provide on the edge of the mirror a spout-like projection which extends upwardly and outwardly from the surface of the mirror adjacent a side edge thereof. The spout-like projection is adapted to be placed adjacent to the cavity in the tooth and serves to guide or direct the filling material from the surface of the mirror to the cavity by manipulation of a conventional instrument commonly known as a "plugger."

It is therefore an object of the present invention to provide means on a dental mirror to facilitate the insertion of a filling material into the cavity of an upper tooth, although it may also be used to advantage in the operation of inserting a filling material into a cavity in a lower tooth.

A further object is to provide an attachment for a dental mirror comprising a substantially semi-circular member having an inwardly directed groove adapted to receive an edge portion of a dental mirror, and said member having a spout-like projection formed thereon which extends upwardly and outwardly from the surface of the mirror, when the attachment is applied thereto, whereby said spout-like projection may be utilized to direct a filling material into the cavity of a tooth.

Other objects of the invention reside in the simple and inexpensive construction of the attachment whereby it may be quickly applied to the edge of a conventional mirror by a "snap action"; in the provision of such a device which is extremely small in size whereby it does not add materially to the over-all size of the mirror; in the provision of such an attachment which may be quickly applied to or removed from a mirror, and which is adjustably secured thereto whereby the location of the spout-like projection may be readily and conveniently varied relative to the usual handle of the mirror.

Other objects of the invention will appear from the following description and the accompanying drawing and will be pointed out in the annexed claim.

In the accompanying drawing there has been disclosed a structure designed to carry out the various objects of the invention, but it is to be understood that the invention is not confined to the exact features shown, as various changes may be made within the scope of the claim which follows.

Figure 1:
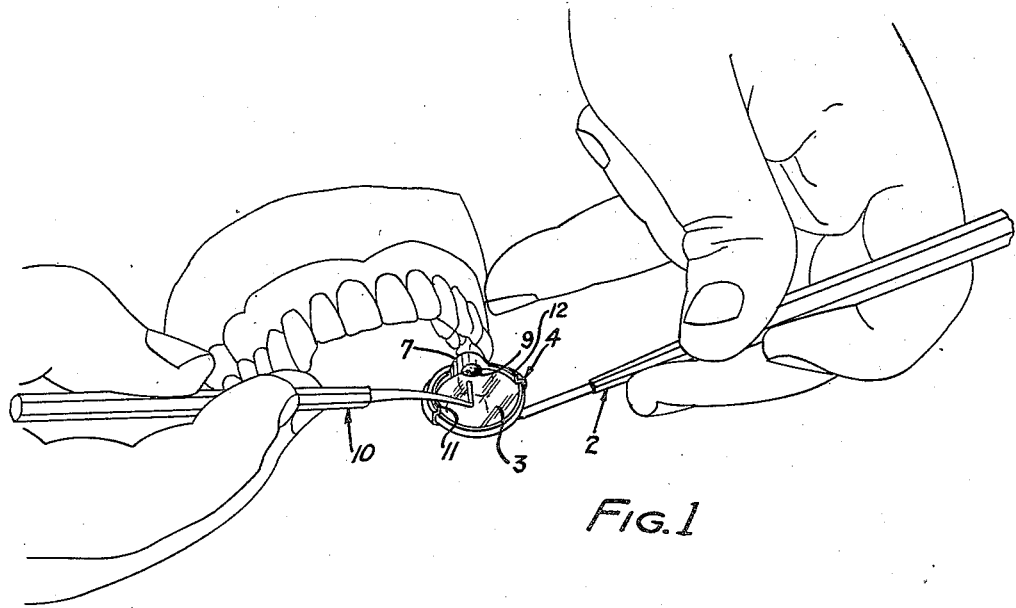
Figure 1 is a perspective view showing how the attachment is utilized in the operation of directing a filling material into the cavity of an upper tooth.
Figure 2:
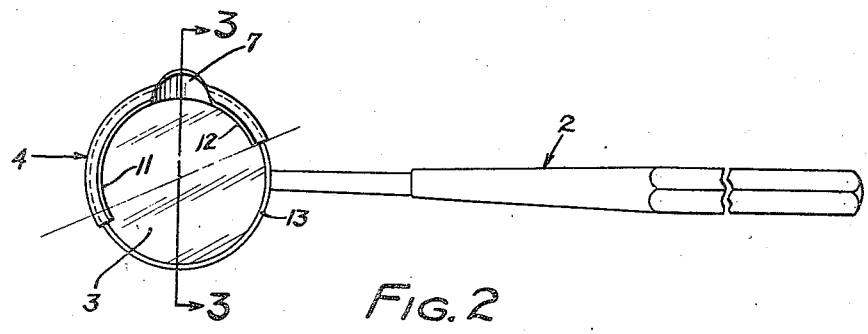
Figure 2 is a plan view of a dental mirror showing my attachment applied thereto.

In the selected embodiment of the invention herein shown, there is illustrated in Figures 1 and 2, a dental mirror comprising the usual handle 2 having a circular mirror 3 secured to one end thereof.

Figure 3:
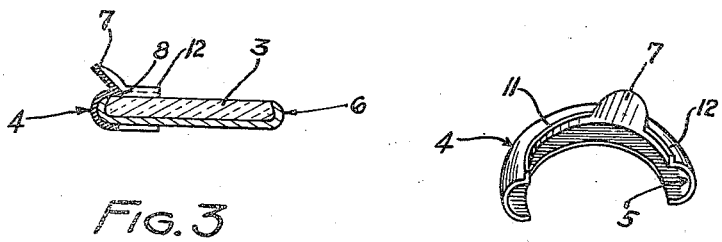
Figure 3 is a sectional view on the line 3—3 of Figure 2, showing the relative position of the spout-like projection with respect to the surface of the mirror.

The novel invention herein disclosed in shown comprising a suitable semi-circular member 4 formed with an inwardly directed groove 5 adapted to receive a portion of the edge 6 of the mirror, as shown in Figures 2 and 3.

The circumferential length of the member 4 is slightly greater than one half the circumferential length of the mirror, as indicated in Figure 2, whereby the member 4 may be fitted onto the edge of the mirror with a snap action, it being understood that the member 4 is preferably constructed of a suitable sheet metal applicable for the purpose, and which has sufficient resiliency to cause it to frictionally engage the periphery of the mirror in such a manner that it will retain its position thereon when in use.

An important feature of the invention resides in the means provided upon the member 4 to facilitate directing a filling material into a tooth cavity. As shown in the drawing, a spout-like projection 7 is formed on the upper edge portion of the member 4, and extends upwardly and outwardly from the surface of the mirror, as best illustrated in Figure 3. By reference to this figure it will be noted that the base 8 of the spout-like projection 7 is disposed in close proximity to the surface of the mirror, whereby a filling material, indicated by the numeral 9 in Figure 1, may readily be slid from the surface of the mirror and over the upper surface of the spout-like projection 7 into the tooth cavity, by manipulation of the usual plugger instrument, generally designated by the numeral 10.

Figure 4:
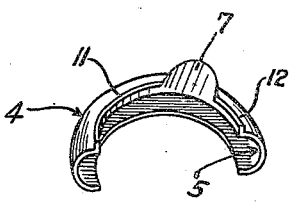
Figure 4 is a perspective view of the attachment removed from the mirror.

In addition to the spout-like projection 7, the upper portion of the member 4 is shown provided with upstanding flanges 11 and 12, which extend from the ends of the member 4 and have their opposite ends merging into the edges of the projection 7, as will be readily understood by reference to Figures 2, 3 and 4.

As result of the member 4 being retained upon the edge of the mirror by friction only, said member may readily be rotatably adjusted thereon as will be understood, thereby to vary the position of the spout-like projection 7 with respect to the handle 2 of the dental mirror.

The flanges 11 and 12 of the member 4 extend only slightly above the surface of the mirror 3, but sufficiently to provide means for catching or temporarily holding on the surface of the mirror, small particles such as the drillings from a tooth cavity. The flanges 11 also provide means for retaining a filling material on the surface of the mirror while manipulating the mirror in the patient's mouth to get the filling material in position to direct it into the cavity with the plugger 10.

While I have herein described the member 4 as being constructed of sheet metal, it is to be understood that it may be constructed of any suitable material applicable for the purpose and which may readily be sterilized to retain it in a sanitary condition. In some cases it may be found desirable to permanently secure the spout-like projection 7 to the annular supporting frame 13 of the mirror. For all practical purposes, however, I have found it more desirable to make the member 4 in the form of an attachment which is so constructed that it may readily be fitted onto a conventional dental mirror without the use of special tools.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

An attachment for a dental mirror comprising a channel-like member having an inwardly facing groove adapted to receive a portion of the edge of the mirror to secure the attachment thereto, said member being substantially uniform in cross-section the major portion of its length, and a small spout-like projection on said member intermediately of its ends, said projection extending upwardly and outwardly from the face of the mirror, the edge of said projection being substantially semicircular in configuration, whereby when said attachment is in use on a mirror, it will not obstruct vision or interfere with instruments in the operation of guiding filling material from the mirror into a tooth cavity.

ROBERT A. DEAN.

REFERENCES CITED

The following references are of record in the file of this patent:

UNITED STATES PATENTS

| Number | Name | Date |
|---|---|---|
| 911,659 | Kleberg | Feb. 9, 1909 |
| 2,140,005 | Greenberg | Dec. 13, 1938 |

OTHER REFERENCES

Scholl, C. R., "Amalgam Carrier," The Dental Cosmos 1920, page 546.